(12) United States Patent
Behl

(10) Patent No.: US 7,068,506 B2
(45) Date of Patent: Jun. 27, 2006

(54) REMOVABLE MEMORY STORAGE DEVICE CARRIER HAVING A HEAT SINK

(76) Inventor: Sunny Behl, 5721 Tubac La., San Jose, CA (US) 95118

( * ) Notice: Subject to any disclaimer, the term of this patent is extended or adjusted under 35 U.S.C. 154(b) by 756 days.

(21) Appl. No.: 09/775,881

(22) Filed: Feb. 2, 2001

(65) Prior Publication Data

US 2001/0024357 A1    Sep. 27, 2001

Related U.S. Application Data

(63) Continuation-in-part of application No. 08/926,874, filed on Sep. 10, 1997, now Pat. No. 6,185,097.

(51) Int. Cl.
*H05K 7/20* (2006.01)

(52) U.S. Cl. ............. 361/695; 361/685; 361/687; 361/690; 174/16.3; 454/184

(58) Field of Classification Search ............ 361/687, 361/694, 695, 717–721; 105/80.3, 122; 454/184; 174/16.3
See application file for complete search history.

(56) References Cited

U.S. PATENT DOCUMENTS

| | | | |
|---|---|---|---|
| 4,642,715 A * | 2/1987 | Ende .................. 360/97.02 |
| 4,751,872 A | 6/1988 | Lawson, Jr. .................. 98/1 |
| 4,926,291 A | 5/1990 | Sarraf .................. 361/384 |
| 5,121,291 A | 6/1992 | Cope et al. .................. 361/384 |
| 5,171,183 A * | 12/1992 | Pollard et al. ............. 454/184 |
| 5,173,819 A | 12/1992 | Takahashi et al. ....... 360/97.03 |
| 5,287,009 A | 2/1994 | Heung .................. 307/141 |
| 5,414,591 A | 5/1995 | Kimura et al. ............. 361/695 |
| 5,438,226 A | 8/1995 | Kuchta .................. 307/125 |
| 5,493,457 A | 2/1996 | Kawamura et al. ....... 369/75.1 |
| 5,510,954 A * | 4/1996 | Wyler .................. 361/685 |
| 5,511,055 A | 4/1996 | Otsuki et al. ............ 369/75.1 |
| 5,514,036 A * | 5/1996 | Lin .................. 454/184 |
| 5,547,272 A | 8/1996 | Paterson .................. 312/223.2 |
| 5,596,483 A | 1/1997 | Wyler .................. 361/683 |
| 5,673,029 A | 9/1997 | Behl et al. .................. 340/635 |
| 5,694,290 A * | 12/1997 | Chang .................. 361/685 |
| 5,707,282 A | 1/1998 | Clements .................. 454/184 |
| 5,808,867 A | 9/1998 | Wang .................. 361/695 |
| 5,828,546 A * | 10/1998 | Tirrell et al. .............. 361/685 |
| 5,828,549 A | 10/1998 | Gandre .................. 361/695 |
| 5,831,822 A | 11/1998 | Hulick .................. 361/687 |
| 5,838,542 A | 11/1998 | Nelson .................. 361/704 |
| 5,870,247 A | 2/1999 | Schirle .................. 360/97.02 |
| 5,876,278 A | 3/1999 | Cheng .................. 454/184 |
| 5,886,851 A * | 3/1999 | Yamazaki et al. ....... 360/97.02 |
| 5,912,799 A * | 6/1999 | Grouell et al. ............ 361/685 |
| 5,927,386 A * | 7/1999 | Lin .................. 165/80.3 |
| 5,955,955 A * | 9/1999 | Corcoran, Jr. et al. ...... 340/607 |

FOREIGN PATENT DOCUMENTS

DE    29519526    7/1996
DE    19701548 A1    8/1997

* cited by examiner

*Primary Examiner*—Boris Chérvinsky
(74) *Attorney, Agent, or Firm*—Townsend and Townsend and Crew LLP

(57) ABSTRACT

A device for removably mounting a hard disk drive in a memory storage housing, includes a carrier for holding a hard disk drive. The carrier being removably mountable in a memory storage device housing. The device also includes a heat sink mounted on the carrier. The carrier fans, an air filter, an air filter cover and a handle.

17 Claims, 7 Drawing Sheets

REMOVABLE MEMORY STORAGE DEVICE CARRIER HAVING A HEAT SINK

CROSS REFERENCE TO THE RELATED APPLICATION

This patent application is a continuation-in-part of U.S. patent application Ser. No. 08/926,874, filed Sep. 10, 1997 now U.S. Pat. No. 6,185,097.

FIELD OF THE INVENTION

The present invention pertains memory storage device carriers that removably mount a hard disk drive in a computer housing, and particularly to those carriers that facilitate cooling of hard disk drives.

BACKGROUND

U.S. Pat. No. 5,673,029 to Behl discloses a hard drive cooling device including a bezel mounted fan. This blows outside air over hard disk drives in a memory storage device bay, cooling hard disk drives in the bay.

Hard disk drives are continually evolving to improve access times, storage capacity, and throughput. Hard drives typically include a platter that spins and a pivoting head that reads and writes data to and from the platter. One way to improve access time is to spin the platter faster. Unfortunately, faster platter speeds may increase hard disk drive temperatures.

Higher hard drive temperatures can decrease the mean time between failure of hard disk drives. Also, when numerous hard disk drives are in a large memory storage system, the sum of the heat generated by the drives drive can heat the system to an undesirable degree. Accordingly, what is desired is an improved way of cooling hard disk drives.

SUMMARY

A device for removably mounting a hard disk drive in a memory storage housing, includes a carrier for holding a hard disk drive. The carrier being removably mountable in a memory storage device housing. The device includes a heat sink mounted on the carrier. Preferably, the heat sink comprises fins mounted on the carrier.

The carrier includes a face and a fan mounted on the face of the carrier, the fins align with respect to the fan to optimize convective cooling. The carrier also includes an air filter mounted on the face to filter air. An air filter cover removably mounts on the face of the carrier to facilitate removal and replacement of the air filter.

The carrier includes lateral rails that slidably mount the carrier in the memory storage housing, and a handle mounted on the face of the carrier to facilitate easy removal and replacement of the carrier in a housing.

BRIEF DESCRIPTION OF THE DRAWINGS

For a further understanding of the advantages of the present invention, reference should be had to the following detailed description taken in conjunction with the accompanying drawing, in which like parts are given like reference numerals and wherein.

DETAILED DESCRIPTION OF THE INVENTION

Figure 1:
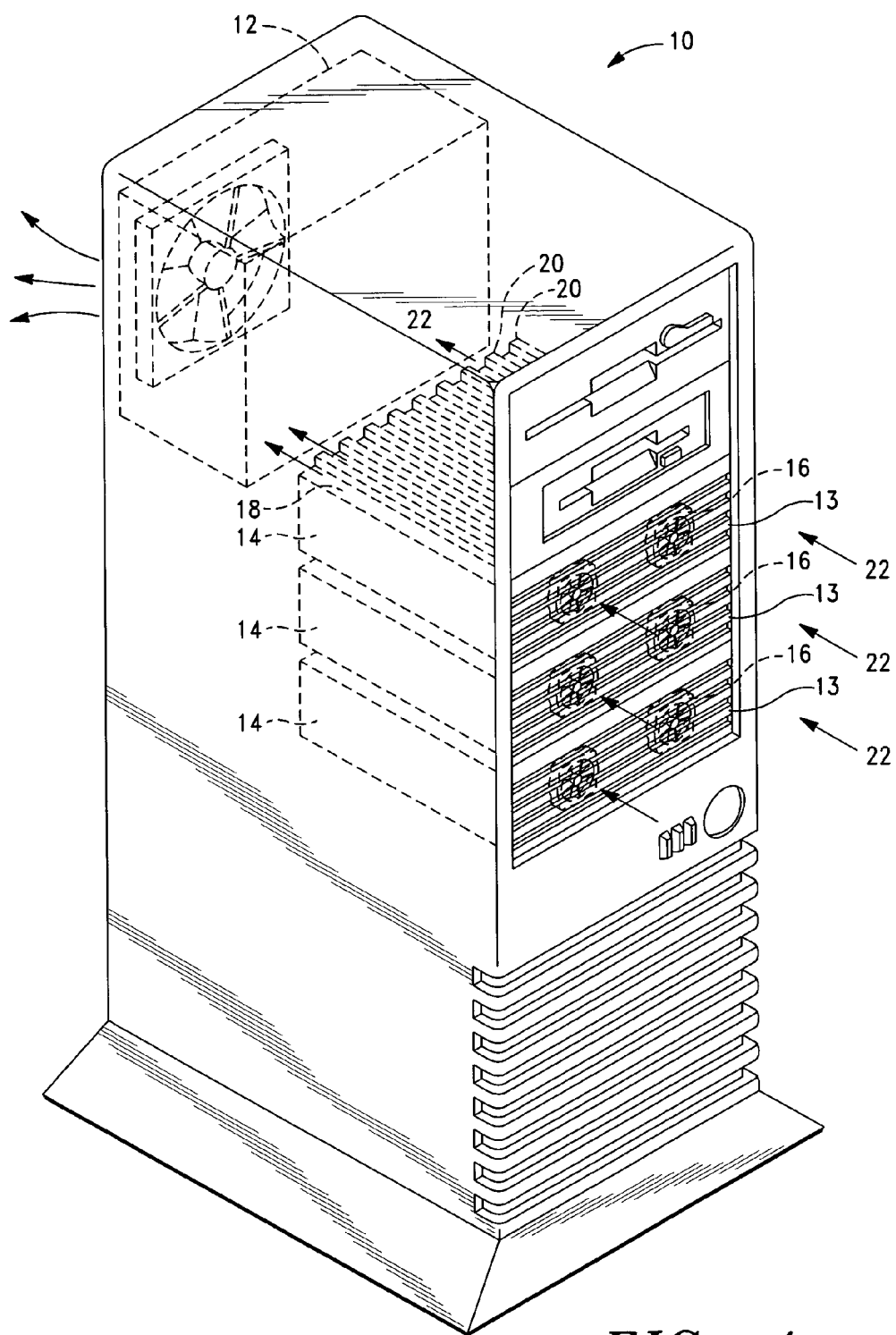
FIG. 1 is the present invention in a memory storage device housing.

FIG. 1 shows a computer including a memory storage device housing generally designated with the reference numeral 10. The memory storage device housing 10 includes a power supply 12, multiple memory storage device bays 13, multiple memory storage devices 14, and memory storage device coolers 16. The power supply 12 powers memory storage devices 14 and the memory storage device coolers 16.

The memory storage device coolers 16 attach within the memory storage device bays 13 to cover the bays 13 and to blow air across the memory storage devices 14 to convectively cool the memory storage devices 14.

Each memory storage device 14 has a surface 18. Each surface 18 is textured to optimize convective cooling. According to one aspect of the invention, each surface 18 includes fins 20. The fins 20 align with airflow from the memory storage device coolers device 16. The airflow is in the direction of the arrows 22.

Figure 2:
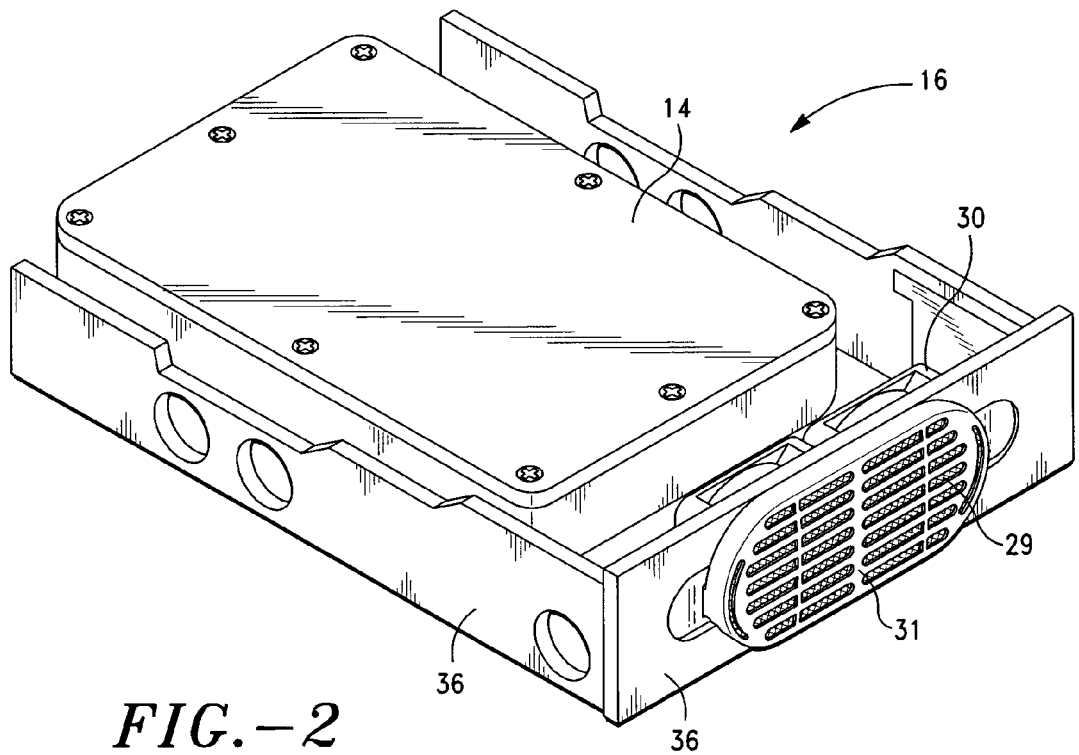
FIG. 2 is a memory storage device mounted in a memory storage device cooler.

FIG. 2 shows a memory storage device cooler 16 attached to a memory storage device 14. The memory storage device cooler 16 has fans 30, an air filter 29 with an air filter cover 31, and a carrier 36. The carrier 36 fixes the memory storage device 14 within a memory storage housing, such as housing 10 of FIG. 1.

Figure 3:
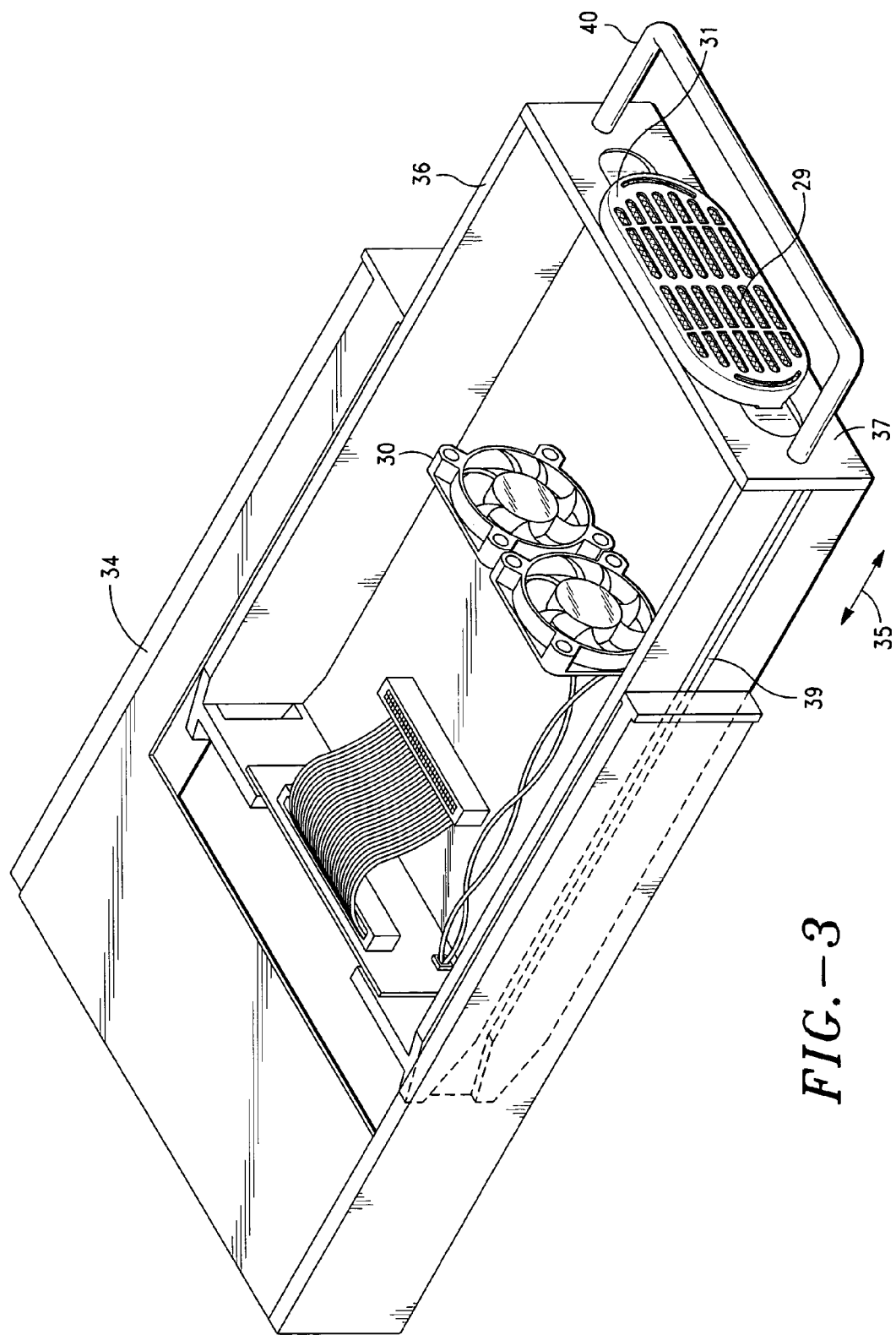
FIG. 3 is a carrier sliding with respect to a housing.

FIG. 3 shows a memory storage device housing generally designated 34 and a memory storage device carrier 36. The carrier 36 includes a face 37 with a handle 40. The air filter 29 and the cover 31 attach to the face 37. The carrier 36 is configured having for removably holding a memory storage device in the housing 34.

The carrier 36 slides into and out from the housing 34 in the direction of the arrows 135. Removable of the carrier 36 is particularly useful in systems having numerous memory storage devices. In a RAID system, for example, the housing 34 in combination with the removable carrier 36 enables hot swapping of hard drives.

Figure 4:
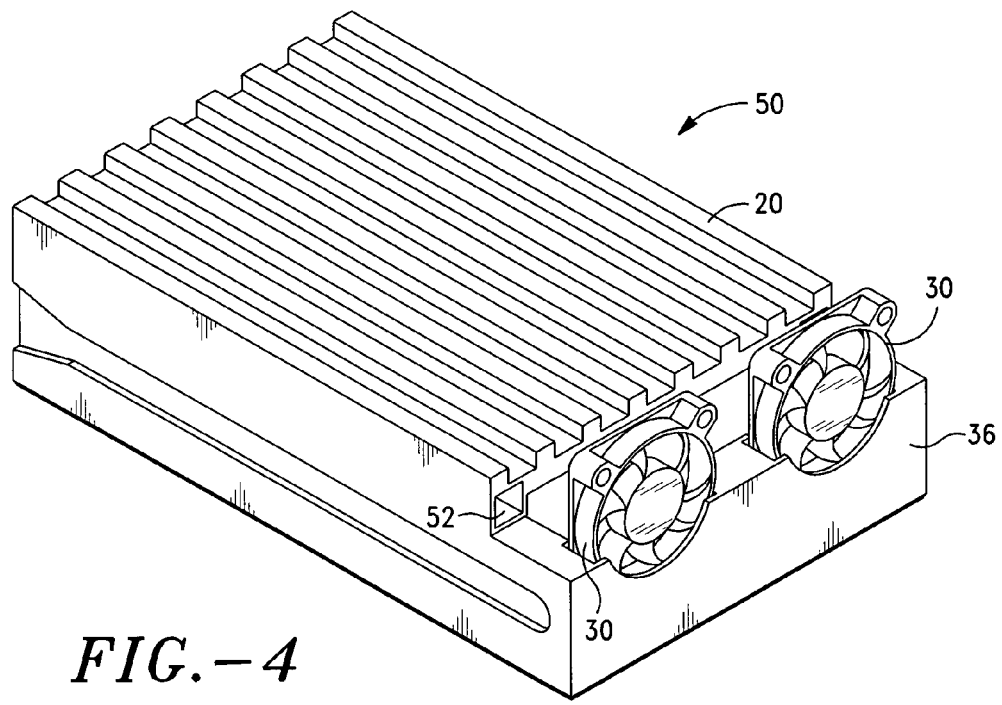
FIG. 4 is a hard disk drive having an integrated heat sink and carrier.

FIG. 4 shows a memory storage device generally designated with a reference numeral 50. The memory storage device 50 includes fans 30, and the carrier 36. The carrier 36 includes cooling fins 20. The carrier 36 is fabricated from a block of aluminum to form a heat sink. The cooling fins 20 align with respect to the fans 30 to optimize convective cooling.

The carrier 36 surrounds a portion of the memory storage device 150 and enables the memory storage device 50 to mount within a housing. According to one aspect of the invention, the fins 20 are integrated with the carrier 36. The carrier 36 facilitates hard drive hot-swappability.

Preferably the carrier 36 covers a portion of the fans 30. The carrier 36 holds the memory storage device, and aligns the fins 20 with respect to the fans 30. According to one aspect of the invention, the carrier 36 and the fins 20 are fabricated from aluminum to optimally conduct heat.

The memory storage device 50 defines an air conduit 52 aligned to receive air flow from at least one fan 30. The fan 30 blows air over the memory storage device 50, along the fins 20 and through the air conduit 52 to optimize convective cooling of the memory storage device 50.

Figure 5:
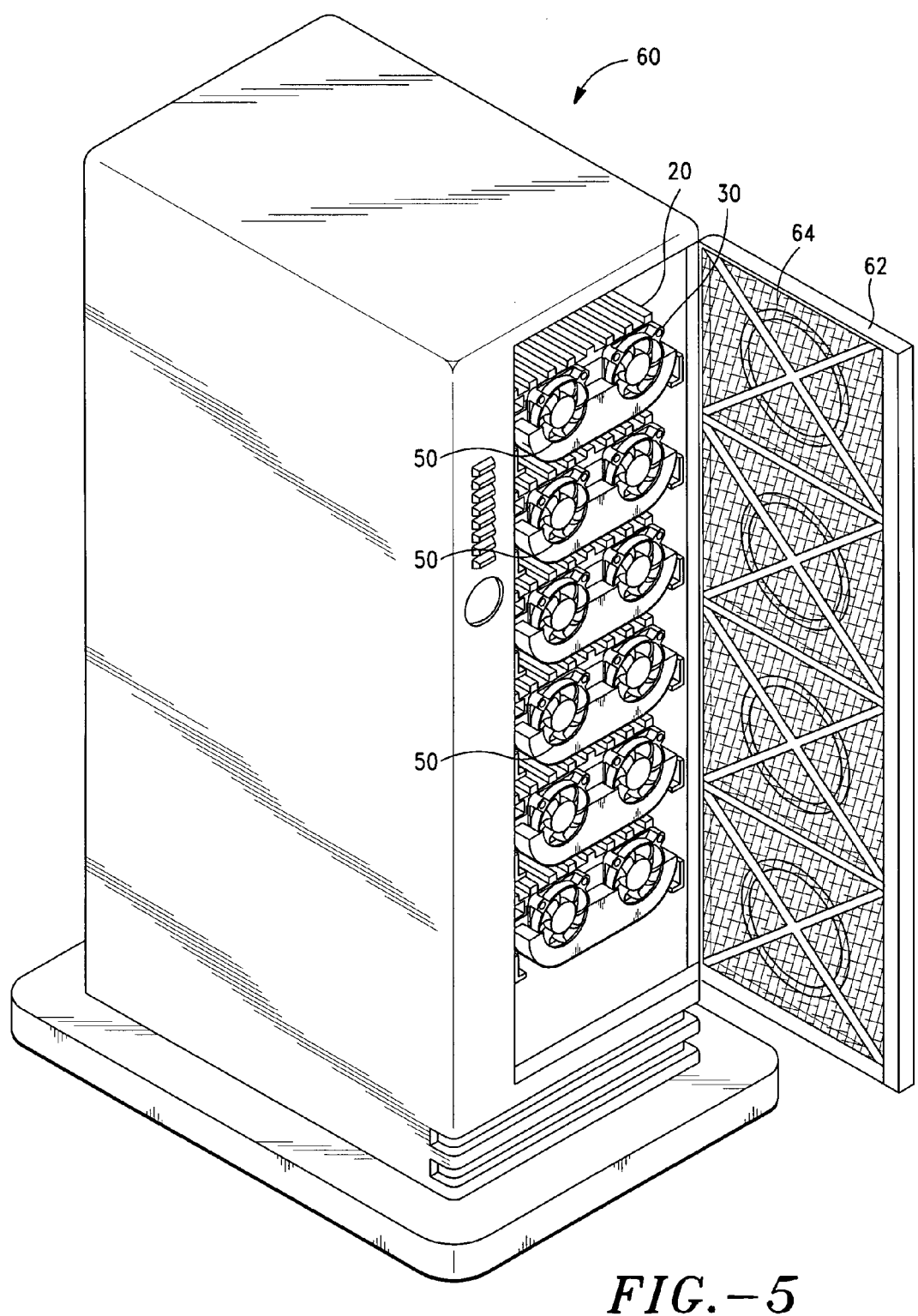
FIG. 5 is a housing in accordance with the present invention.

FIG. 5 shows a memory storage device housing generally designated with the reference numeral 60. The housing 60 holds memory storage devices 50. The housing 60 includes a vented cover 62 having an air filter 64.

The memory storage devices 50 are stacked closely and removably mounted in the housing 60. The cover 162 is hinged to facilitate access to the memory storage devices 50. The hinged cover 62 enables easy removal and replacement of the hard disk drives 50.

According to one aspect of this invention, the memory storage devices 50 are stacked closely enough to touch. The fins 20 and fans 30 cooperate to force air flow between the memory storage devices 50 to cool the memory storage devices 50.

Figure 6:
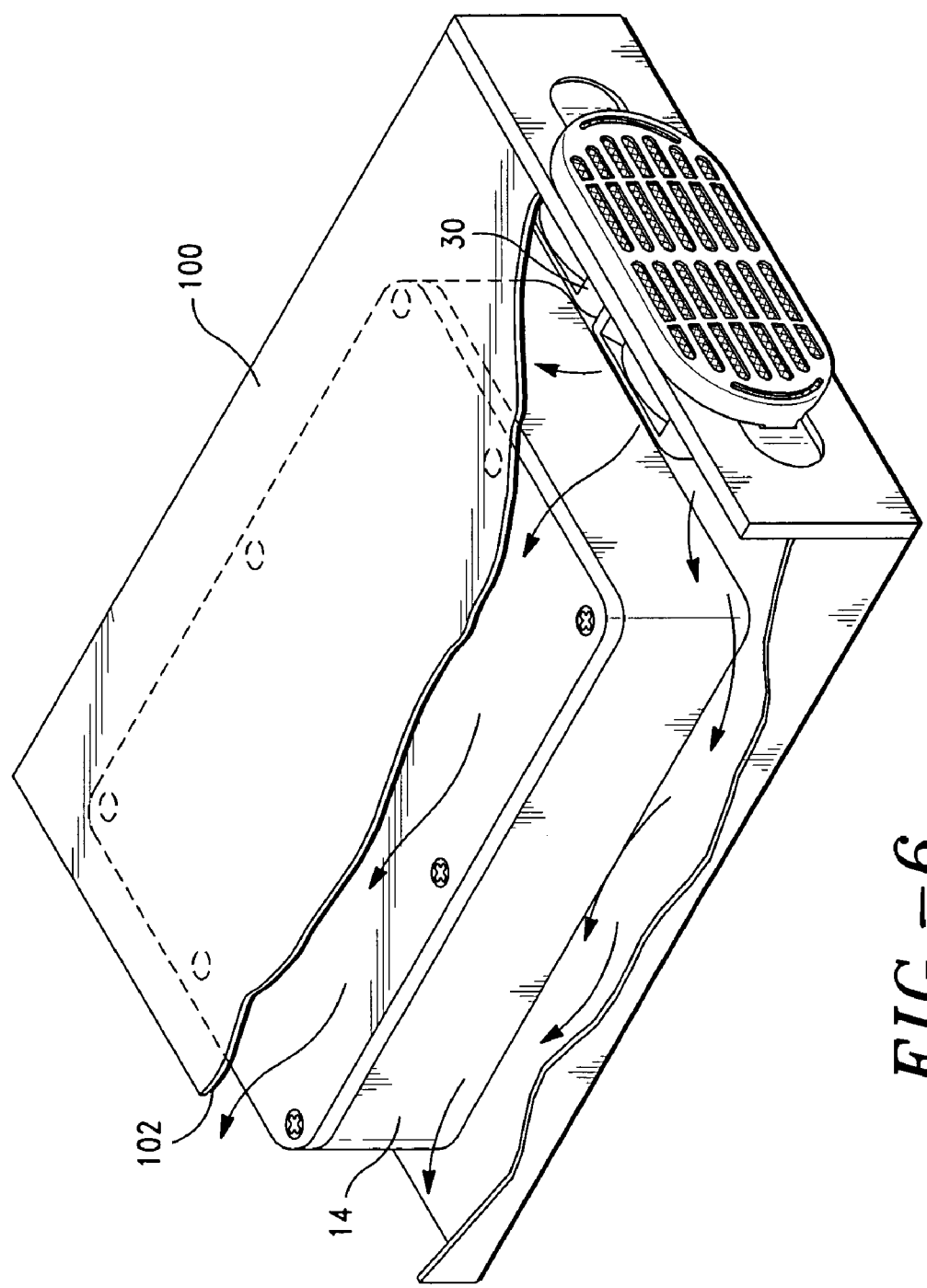
FIG. 6 is a heat sink surrounding a memory storage device.

FIG. 6 is a perspective view of a heat sink 100 enclosing the memory storage device 14. The heat sink 100 forms a tunnel, in which, the memory storage device 14 mounts. The fan 30 attaches to the memory storage device 14 on one side of the tunnel. The heat sink 100 has an opening 102 at one end of the tunnel which opposes the fan 30. Accordingly the heat sink 100 operates as a conduit to direct air from the fan 30 along the exterior of the memory storage device 14 so that the heat sink 100 can closely stack multiple memory storage devices in a memory storage housing (FIG. 5) without overheating.

Figure 7:
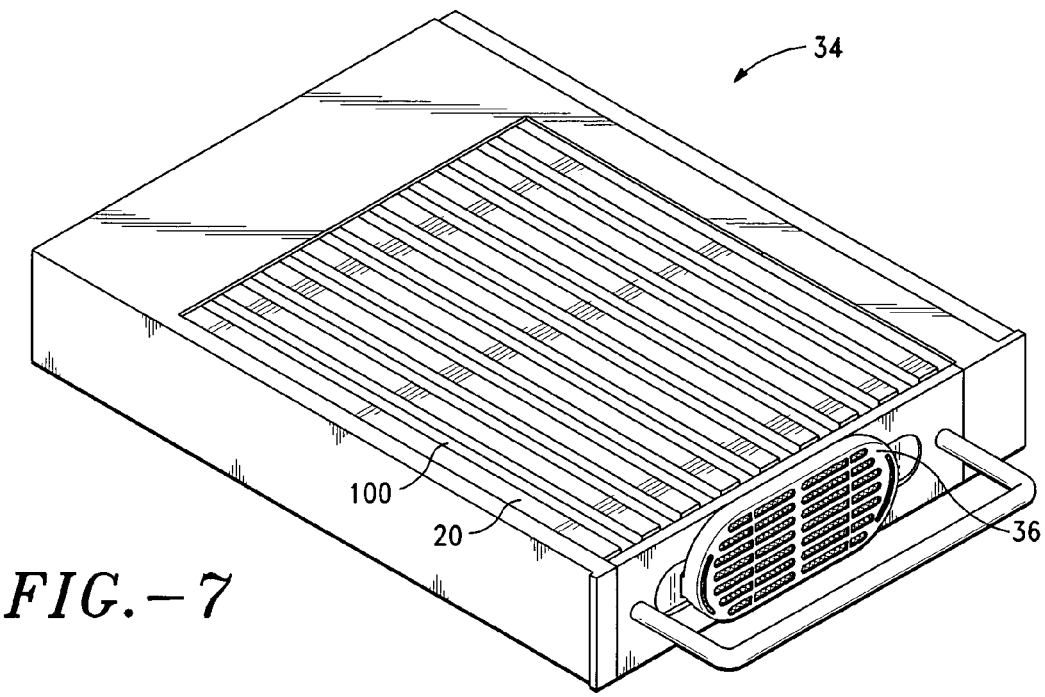
FIG. 7 is a carrier in a housing.

FIG. 7 shows the a carrier 36 inserted into a housing 34. The carrier 36 includes the fins 20. Accordingly, the carrier 36 and the heat sink 100 (FIG. 6) are integrated.

Figure 8:
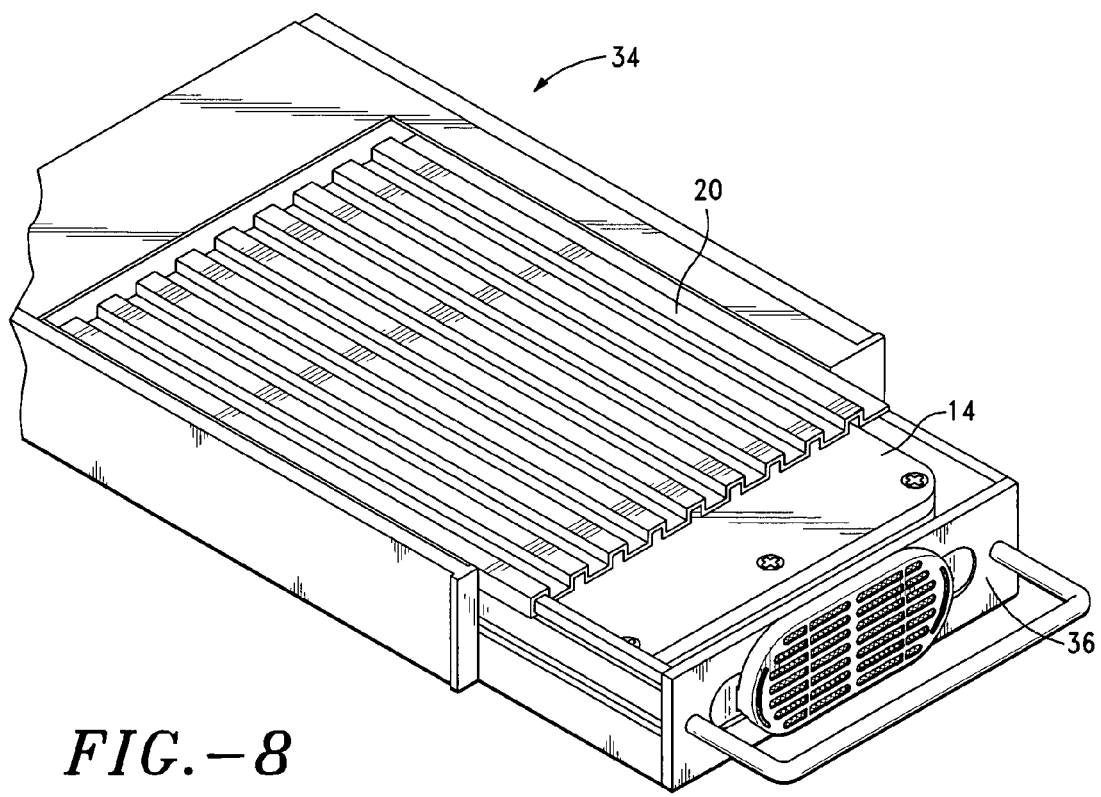
FIG. 8 is a carrier in a housing.

FIG. 8 shows the heat sink 100, with fins 20. The heat sink 100 attaches to the carrier 36, forming a cover. Preferably, the heat sink 100 is removable. According to one aspect of the invention, the heat sink 100 slides with respect to the carrier 36, exposing the memory storage device 14.

Figure 9:
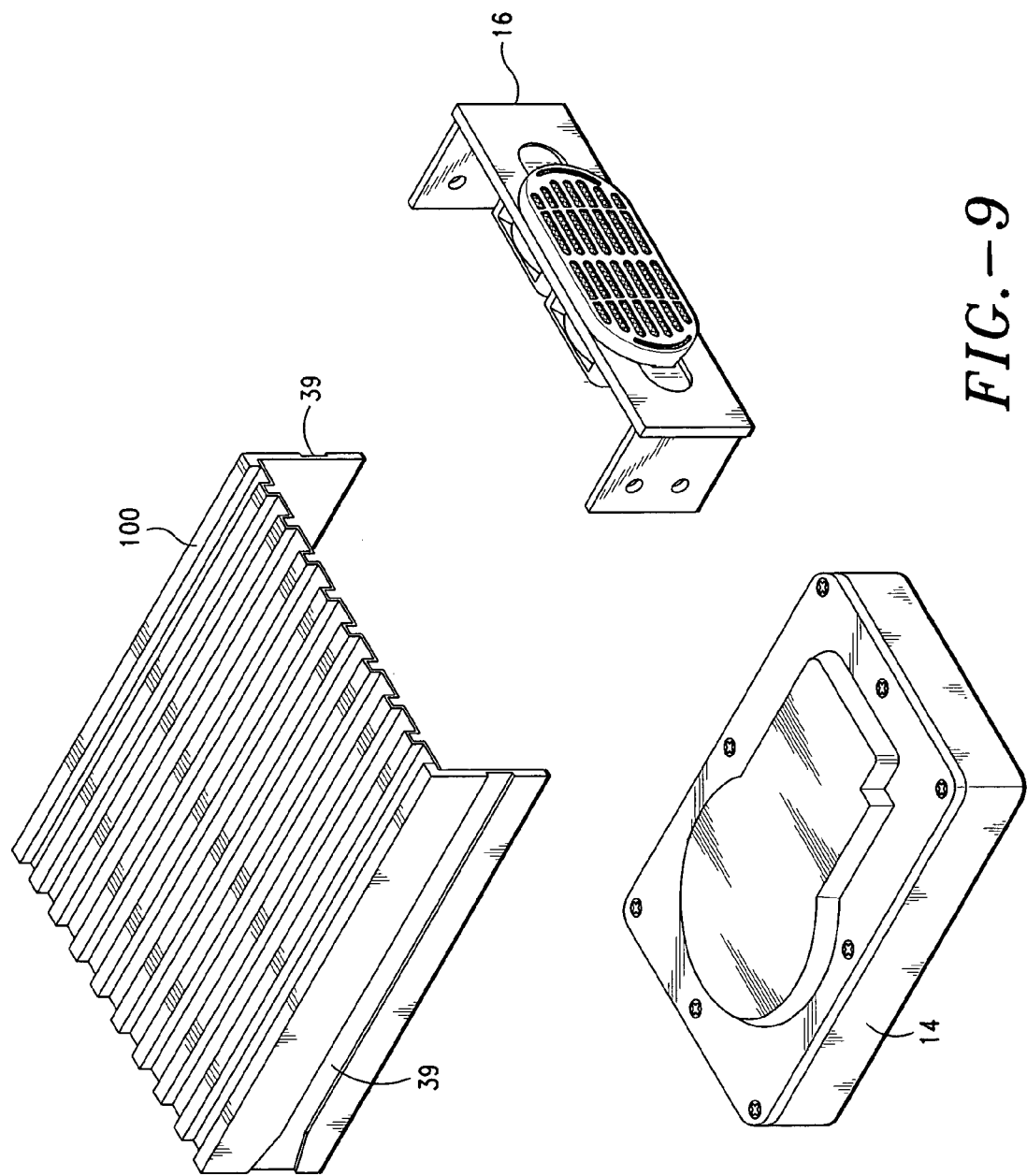
FIG. 9 is a heat sink and a memory storage device cooler mounting on a memory storage device.

FIG. 9 shows the heat sink 100 and the memory storage device 14. The heat sink 100 surrounds a portion of the memory storage device 14. A memory storage device cooler 16 attaches to an end of the heat sink 100. The heat sink 100 functions as the carrier 36, having lateral rails 39 to facilitate a sliding engagement with a memory storage device housing.

While the foregoing detailed description has described various embodiments of the invention it is to be understood that the above description is illustrative only and not limiting of the disclosed invention. Accordingly, the invention is to be limited only by the claims.

The invention claimed is:

1. A device for removably mounting a hard disk drive in a memory storage housing, the device comprising:
   a carrier for holding a hard disk drive, the carrier being removably mountable in the memory storage device housing; and
   a heat sink mounted on the carrier, wherein the heat sink and the carrier are configured to slide together into the memory storage device housing.

2. A device as set forth in claim 1, wherein the carrier includes a face and a fan mounted on the face of the carrier, wherein the heat sink comprises fins and wherein the fan is configured to blow air between the fins.

3. A device as set forth in claim 2, wherein the carrier includes an air filter mounted on the face to filter air.

4. A device as set forth in claim 3, wherein the carrier includes an air filter cover removably mounted on the face to facilitate removal and replacement of the air filter.

5. A device as set forth in claim 1, wherein the carrier includes lateral rails that slidably mount the carrier in the memory storage housing.

6. A device as set forth in claim 1, wherein the carrier includes a face and a handle mounted on the face of the carrier.

7. A device for removably mounting a hard disk drive in a memory storage housing, comprising:
   a carrier for holding a hard disk drive, the carrier being removably mountable in a memory storage device housing; and
   a heat sink slidably mounted on the carrier.

8. A device as set forth in claim 7, wherein the carrier includes a face and a fan mounted on the face of the carrier.

9. A device as set forth in claim 8, wherein the carrier includes an air filter mounted on the face to filter air.

10. A device as set forth in claim 9, wherein the carrier includes an air filter cover removably mounted on the face to facilitate removal and replacement of the air filter.

11. A device as set forth in claim 7, wherein the carrier includes lateral rails that slidably mount the carrier in the memory storage housing.

12. A device as set forth in claim 7, wherein the carrier includes a face and a handle on the face of the carrier.

13. A device as set forth in claim 7, wherein the heat sink includes a plurality of fins and wherein the heat sink forms a cover.

14. A device as set forth in claim 7, wherein the heat sink includes a plurality of fins and wherein the heat sink forms a solid, non-perforated cover.

15. A device for removably mounting a hard disk drive in a memory storage housing, the device comprising:
   a carrier for holding a hard disk drive, the carrier being removably mountable in the memory storage device housing;
   a heat sink mounted on the carrier, wherein the heat sink comprises a plurality of fins and an enclosed air conduit, wherein the air conduit runs parallel to the plurality of fins; and
   at least one fan configured to blow air over and under heat sink.

16. A device as set forth in claim 15 wherein the heat sink forms a cover for the carrier.

17. A device as set forth in claim 15 wherein the carrier has side rails which engage rails of the memory storage housing.

* * * * *